United States Patent [19]

Kubo et al.

[11] 4,427,098

[45] Jan. 24, 1984

[54] TORQUE TRANSMISSION APPARATUS INCLUDING DIRECT COUPLING CLUTCH AND FLUID-TYPE TORQUE CONVERTER

[75] Inventors: Seitoku Kubo, Toyota; Koujiro Kuramochi, Okazaki; Tatsuo Kyushima, Toyota, all of Japan

[73] Assignee: Toyota Jidosha Kogyo Kabushiki Kaisha, Aichi, Japan

[21] Appl. No.: 273,320

[22] Filed: Jun. 15, 1981

[30] Foreign Application Priority Data

Aug. 20, 1980 [JP] Japan .................. 55-113399

[51] Int. Cl.³ .............................................. F16D 3/66
[52] U.S. Cl. .................. 192/3.28; 192/106.2; 192/70.18
[58] Field of Search ........... 192/3.28, 3.29, 3.3, 192/3.31, 106.1, 106.2, 70.18; 464/67, 68

[56] References Cited

U.S. PATENT DOCUMENTS

| | | | |
|---|---|---|---|
| 2,613,785 | 10/1952 | Mohns | 192/106.2 X |
| 3,974,903 | 8/1976 | de Gennes | 192/106.2 |
| 4,305,487 | 12/1981 | Sunohara | 192/106.2 |
| 4,333,552 | 6/1982 | LaMarche | 192/3.29 |

*Primary Examiner*—George H. Krizmanich

*Attorney, Agent, or Firm*—Parkhurst & Oliff

[57] ABSTRACT

In a torque transmission apparatus of an automatic transmission for an automotive vehicle, a direct coupling clutch is provided in parallel to a fluid type torque converter. The direct coupling clutch comprises; a first clutch element connected to an input shaft or an output shaft; a first circular coupling element engaging a second clutch element disposed in an opposing relation to the first clutch element, in a manner to effect the relative movement to the second clutch element in the axial direction alone thereof; second and third circular coupling elements coupled to each other at a spacing from each other, with the first circular coupling element interposed therebetween, and adapted to rotate relative to the first circular coupling element through a given angle; and compression coil springs retained in the first circular coupling element and engaging the second and third circular coupling elements, thereby absorbing shock due to the relative rotation of the first circular coupling element to the second and third circular coupling elements; the compression coil springs having a surface hardness nearly equal to the surface hardness of the compression-coil-spring retaining portions of the first circular element and the engaging portions of the second and third circular elements.

6 Claims, 4 Drawing Figures

FIG. 2
FIG. 3
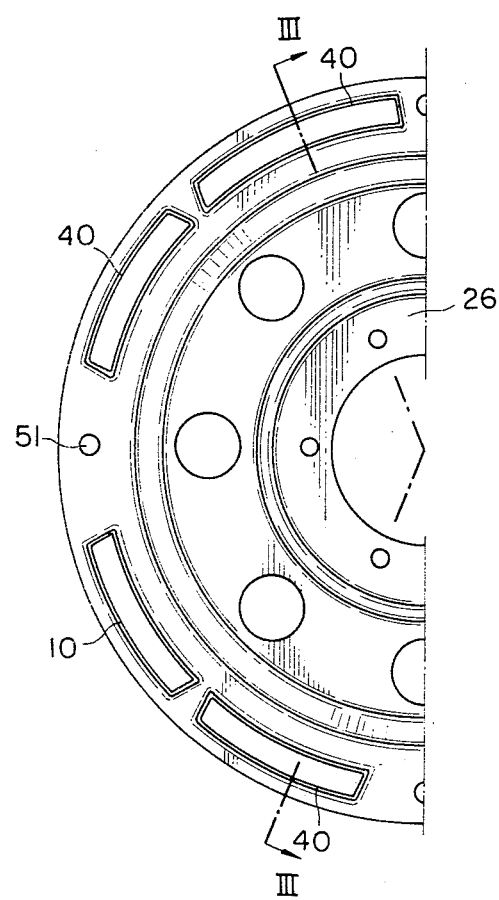
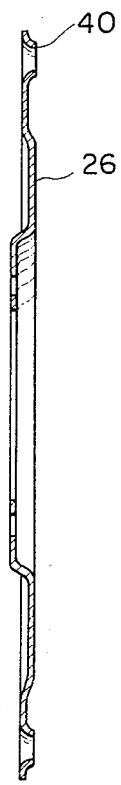

TORQUE TRANSMISSION APPARATUS INCLUDING DIRECT COUPLING CLUTCH AND FLUID-TYPE TORQUE CONVERTER

BACKGROUND OF THE INVENTION

1. Field of the Invention

This invention relates to a torque transmission apparatus including a fluid-type torque converter including a pump impeller connected to an input shaft and a turbine runner and a stator which are connected to an output shaft, and a direct coupling clutch for mechanically connecting the input shaft and the output shaft to each other.

2. Description of the Prior Art

A torque transmission apparatus of the type, in general, includes, a first circular coupling element engaging the other clutch element of a direct coupling clutch, in a manner to permit a relative movement to the other clutch element in the axial direction thereof, one clutch element of the direct coupling clutch being connected to an input shaft or an output shaft; second and third circular coupling elements coupled to each other at a spacing from each other in a manner to effect a relative rotation to the first circular coupling element through a given angle; and compression coil springs by the first circular coupling element and engaging the second and third circular coupling elements, so as to absorb shock due to the relative rotation of the first circular coupling element to the second and third circular coupling elements; the compression coil springs being adapted to cyclically compress and expand upon receiving a changing torque of an engine which is introduced by way of the input shaft, thereby relieving a changing torque to transmit same to the output shaft.

In this connection, because of a difference in surface hardness between the compression coil springs and the spring retaining portions of the first circular coupling element and the engaging portions of the second and third circular coupling elements, either the compression coil springs or the sliding portions of the first, second and third circular coupling elements, which are lower in surface hardness, suffer severe wear, thus impairing the durability of the direct coupling clutch.

SUMMARY OF THE INVENTION

It is accordingly an object of the present invention to provide a torque converter apparatus, wherein compression coil springs and the compression coil spring-retaining portions of a first circular coupling element and the engaging portions of second and third circular coupling elements are prevented from being worn too early, and the durability of these elements is thus improved.

To attain the object, there is provided according to the present invention a torque converter apparatus, wherein the surface hardness of compression coil springs is made equal to those of the compression coil spring retaining portions and engaging portions of first, second and third circular coupling elements. If a difference in surface hardness between the compression coil springs and the spring-retaining portions and engaging portions of these circular elements is in short of 200 in Vicker's hardness, these elements are considered as having the same surface hardness. A wear due to the relative sliding movements between the compression coil springs and first, second and third circular coupling element is greatly reduced, extending the service life of the direct coupling clutch.

The first circular coupling element is advantageously provided with arcuate openings, in which compression coil springs are to be retained.

The compression coil springs preferably have a central axis running along the arc of the arcuate openings in the first circular element.

The second and third circular coupling elements preferably are provided with arcuate bulged portions substantially in register with the arcuate openings in the first circular coupling element, the arcuate bulged portions being bulged in a direction to be away from the first circular coupling element when these circular elements are assembled. The compression coil springs are partly fitted in the arcuate bulged portions in the second and third circular elements.

Each arcuate bulged portion preferably has an escape opening. The contacting area of the compression coil springs with the second and third circular coupling elements is reduced by an area commensurate to the escape openings, for reduction of wear on the compression springs and these circular elements.

BRIEF DESCRIPTION OF THE DRAWINGS

FIG. 2 is a fragmentary front view of a circular coupling element of the torque converter apparatus;

FIG. 3 is a cross sectional view taken along the line III—III of FIG. 2; and

DESCRIPTION OF THE PREFERRED EMBODIMENTS

Figure 1:
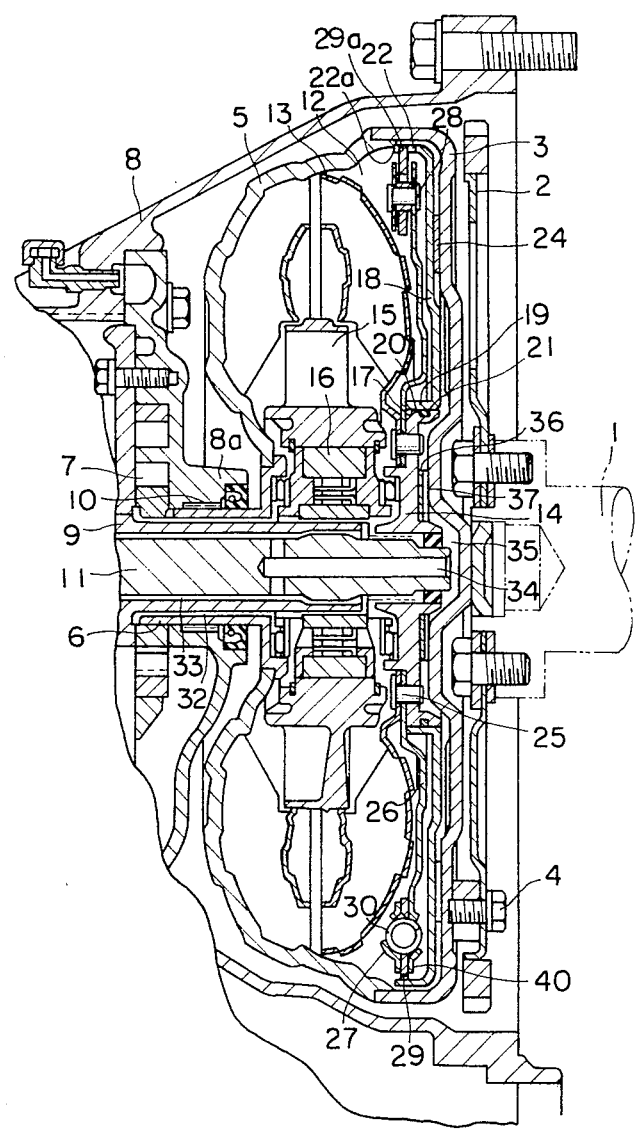
FIG. 1 is a longitudinal cross sectional view of the torque transmission apparatus according to the present invention.

Referring first to FIG. 1, an input shaft 1 is connected to an engine (not shown) and rotates clockwise, as viewed from the right side of FIG. 1. Mounted on the input shaft 1 is a fly wheel 2, to which a front cover 3 is coupled by bolts 4, so as to rotate integrally with the fly wheel 2. The outer circumferential portion of the front cover 3 is connected to the outer circumferential portion of a pump impeller 5 of the torque converter. The pump impeller 5 is fixedly mounted on a hollow shaft 6 coaxial with the input shaft 1, and operates a hydraulic pressure pump 7 by way of the hollow shaft 6. The hollow shaft 6 coaxially surrounds a sleeve 9 attached to a converter housing 8 and is rotatably supported, through the medium of a bearing 10, by an oil pump cover 8a, which is attached to the housing 8.

An output shaft 11 is coaxially fitted in the sleeve 9. A turbine runner 13 is attached by rivets 25 to a hub 14 in a facing relation to the pump impeller 5 within a fluid chamber 12 defined by the front cover 3 and the pump impeller 5. The hub 14 is spline-fitted on the output shaft 11, so as to permit transmission of torque thereto. There is provided between the pump impeller 5 and the turbine runner 13 a stator 15 for guiding fluid which recirculates from the turbine runner to the pump impeller. The stator is supported on the sleeve 9 through the medium of a one-way clutch 16.

The hub 14 has a cylindrical outer peripheral portion 17 with which the inner peripheral wall of a tubular inner circumferential portion 19 of a circular piston 18 disposed within the fluid chamber 12 is maintained in engagement. The cylindrical outer circumferential portion 17 of the hub 14 is provided with an annular groove 20, into which a seal ring 21 is fitted, thereby providing a seal between the outer peripheral wall of the cylindrical portion of the hub 14 and the inner peripheral wall of the tubular inner circumferential portion of the piston 18. The piston 18 has a lining 24 facing the front cover 3, and the piston 18 and the front cover 3 serve as clutch elements of the direct coupling clutch, respectively. The piston 18 has a cylindrical outer circumference 22, on which a plurality of axial slits 22a are provided in an equi-angular spacing from each other in the circumferential direction thereof.

A first driven disc 26 serving as a circular coupling element is attached to the hub 14 (FIGS. 2 and 3). A second driven disc 27 serving as another circular coupling element is disposed in an opposing relation to the circumferential portion of the driven disc 26. These two driven discs 26 and 27 are coupled to each other at a spacing from each other by means of rivets 28 driven into the circumferential portions thereof. A drive disc 29 serving as a further circular coupling element is interposed between the driven discs 26 and 27 at a small spacing from the opposing inner side surfaces of these discs in a manner to effect a relative rotation through a given angle to these driven discs 26 and 27, with the circumferential tooth-shaped projections 29a engaging the axial slits 22a provided in the cylindrical outer peripheral portion 22 of the piston 18 in a manner to be axially movably relative to the slits. Thus, transmission of torque thereto is permitted.

A plurality of compression coil springs 30 are fitted into arcuate bulged portions provided circumferentially in the driven discs 26 and 27, and arcuate openings provided in the drive disc 29 in register with the bulged portions which will be more in detail described later, thereby achieving the flexible coupling in the rotating direction, of the driven discs 26,27 to the drive disc 29, whereby these compression coil springs 30 absorb shock due to the relative movement of the drive disc 29 to the driven discs 26,27.

Figure 4:
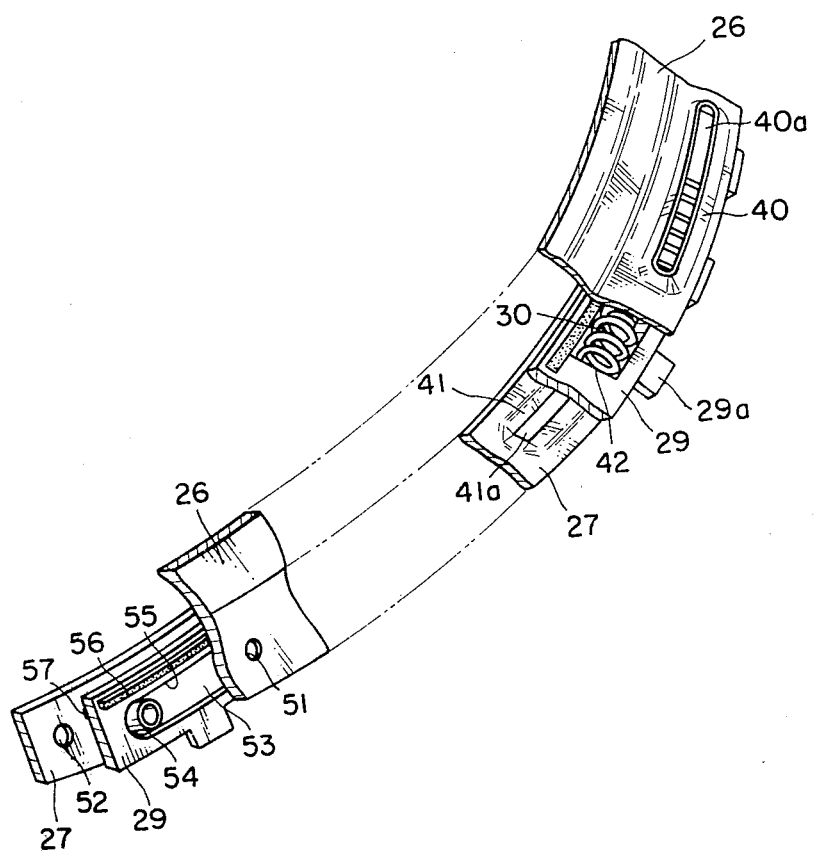
FIG. 4 is an exploded perspective view of three circular coupling elements, showing the outer circumferential portions thereof.

FIG. 4 is a fragmentary view of the circumferential portions of discs 26,27 and 29. The plurality of arcuate bulged portions 40 respectively having a top escape opening 40a and the plurality of arcuate bulged portions 41 respectively having a top escape opening 41a are provided in the circumferential portions of the driven discs 26 and 27, these bulged portions 40 and 41 in the driven discs 26 and 27 projecting in the opposite directions and being brought into register with each other, when these driven discs are assembled. The plurality of arcuate openings 42 are provided in the circumferential portion of the drive disc 29 in register with the arcuate bulged portions 40 and 41 in the driven discs 26 and 27. The aforesaid compression coil springs, with their central axis running in the direction of arc, are retained in the plurality of openings 42, with their lateral portions or flank portions fitted into the arcuate bulged portions 40 and 41 in the driven discs 26 and 27, as described in the foregoing.

At least the spring-retaining portions of the drive disc 29 and the engaging portions of the driven discs 26 and 27, namely, the sliding portions relative to the springs, of the driven discs, have the surface hardness equal to that of the compression coil springs 30. This is achieved by properly selecting a material for these discs 26,37 and 29 or the coil spring 30, or by applying a proper surface treatment to these discs and springs. In this connection, if a difference in surface hardness between the discs and the springs is in short of 200 in Vicker's hardness, it may be considered that these discs and the springs be equal in surface hardness.

In order to permit a relative rotation of the drive disc 29 to the driven discs 26 and 27 through a given angle, a plurality of rivet holes 51 and 52, into which rivets 28 for coupling these driven discs are to be driven, are provided in the driven discs 26 and 27 between the adjacent arcuate bulged portions 40 and between the adjacent arcuate bulged portions 41, respectively. On the other hand, a plurality of arcuate slots 53 are provided in the drive disc 29 in the portions covering the rivet holes 51 and 52 in the driven discs, these arcuate slots having a length equivalent to a given angle, through which the relative rotation of the drive disc to the driven discs are permitted. A tubular spacer 54 is fitted into respective arcuate slot 53, with the flank portion thereof slidingly contacting one longitudinal edge 55 of the slot. By fitting the rivets 28 into the tubular spacers 54, the driven discs 26 and 27 are coupled to the drive disc 29 at a spacing therefrom. The length of each tubular spacer 54 defines a spacing between the discs 26 and 27.

Tapes of frictional materials 56 and 57 are attached to the both side surfaces of the drive disc 29, so that the soft frictional engagement between the drive disc 29 and the driven disc 26 and that between the drive disc 29 and the driven disc 27 are achieved by way of these frictional materials 56 and 57. When the relative rotation of the drive disc 29 to the driven discs 26 and 27 takes place, then hysteresis accrues from friction of the frictional materials 56 and 57 with the driven discs 26 and 27.

In order to mechanically directly connect the input shaft 1 to the output shaft 11, hydraulic pressure is introduced from the base portion of the stator 15, by way of an oil passage 32 between the hollow shaft 6 and the sleeve 9, into the fluid chamber 12, and hence to the left side of the piston 18, whereby the piston 18 being a clutch element is pressed against the front cover 3, which is another clutch element, thereby being brought into frictional engagement with the front cover 3 through the medium of the lining 24. Torque is thus mechanically transmitted from the input shaft 1, via the front cover 3, piston 18, drive disc 29, compression coil springs 30, driven discs 26,27 and hub 14, to the output shaft 11. If torque from the input shaft 1 abruptly increases in the process of transmission of torque from the input shaft to the output shaft by means of the direct coupled clutch, the compression coil springs 30 become temporarily compressed to absorb the increment of torque, thereby preventing occurance of a large variation in the torque being transmitted to the output shaft 11.

When hydraulic pressure is supplied from a hole 34 in the output shaft 11, via an oil passage 33 between the sleeve 9 and the output shaft 11, the end chamber 35, and the groove 37 provided in the washer 36 between the front cover 3 and the hub 14, into the space between the front cover 3 and the piston 18, then the piston 18 disengages from the front cover 3, whereby the frictional engagement between the piston 18 and the front cover 3 through the medium of the lining 24 is released, stated otherwise, engagement of the direct coupling clutch is released. Consequently, transmission of torque from the input shaft 1 to the output shaft 11 is conducted by way of the fluid type torque converter consisting of the pump impeller 5, turbine runner 13 and stator 15.

As is apparent from the foregoing, since the spring-retaining portions and the engaging portions of the drive disc 29 and the driven discs 26,27 which are circular coupling elements for transmitting torque from the piston 18, which is a driven clutch element of the direct coupled clutch, to the output shaft have the surface hardness equal to the surface hardness of the compression coil springs 30, wear occurs uniformly in these portions, thus extending a service life of the direct coupling clutch. Furthermore, since escape openings 40a and 41a are provided in the arcuate bulged portions 40 and 41, respectively, in the driven discs, contacting areas of the driven discs 26 and 27 with the compression coil springs 30 are reduced by an area commensurate to the escape openings, thus reducing wear of these discs.

What is claimed is:

1. A torque transmission apparatus including a direct coupling clutch having first and second clutch elements and a fluid-type torque converter including a pump impeller coupled to an input shaft and a turbine runner and a stator coupled to an output shaft, comprising:
   a first circular coupling element engaging said first clutch element of said direct coupling clutch and constructed to permit its movement in an axial direction relative to said first clutch element, said direct coupling clutch having said second clutch element coupled to one of said input shaft and said output shaft;
   second and third circular coupling elements coupled to one another and spaced from said first circular coupling element, with said first circular coupling element interposed therebetween, said second and third circular coupling elements being constructed and arranged to allow their rotation through a given angle relative to said first circular coupling element; and
   compression coil springs retained in portions of said first circular coupling element and engaging portions of said second and third circular coupling elements, to thereby absorb shock due to the relative rotation of said first circular coupling element with respect to said second and third circular coupling elements, one of said second and third circular coupling elements being coupled to the other of said input shaft and said output shaft, said compression coil spring retaining portions of said first circular coupling element and said spring engaging portions of said second and third circular coupling elements having a surface hardness substantially equal to the surface hardness of said compression coil springs.

2. A torque transmission apparatus as defined in claim 1, wherein a difference in surface hardness between said compression coil springs and the spring-retaining portions of said first circular coupling element and the engaging portions of said second and third circular coupling elements is less than 200 in Vickers' hardness.

3. A torque transmission apparatus as defined in claim 2, wherein said first circular coupling element is provided with arcuate openings, and said compression coil springs are retained in said arcuate openings, respectively.

4. A torque transmission apparatus as defined in claim 3, wherein said compression coil springs respectively have a central axis along the arc of the arcuate opening.

5. A torque transmission apparatus as defined in claim 4, wherein said second and third circular coupling elements are provided with arcuate bulged portions substantially in registry with said arcuate openings in said first circular coupling element, said arcuate bulged portions in said second and third circular coupling elements having a bulge in a direction away from said first circular coupling element with said compression coil springs being partly received in the bulge of said arcuate bulged portions.

6. A torque transmission apparatus as defined in claim 5, wherein each of said arcuate bulged portions has an arcuate opening.

* * * * *